June 24, 1930.                    R. L. ADAMS                    1,767,500
                          AUTOMOBILE BODY CONSTRUCTION
                               Filed Nov. 20, 1926
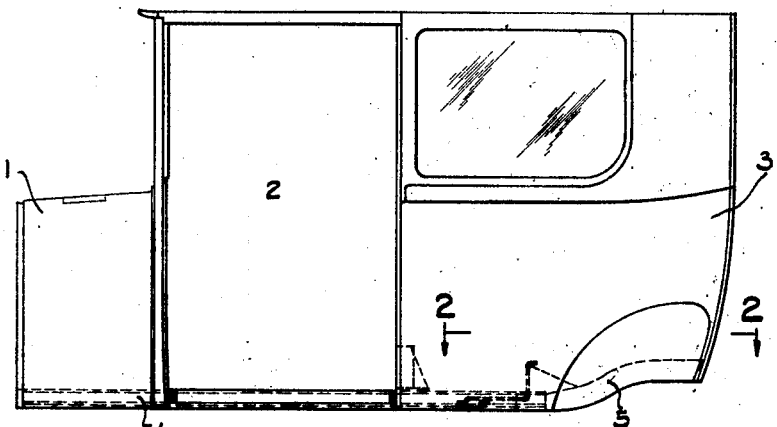
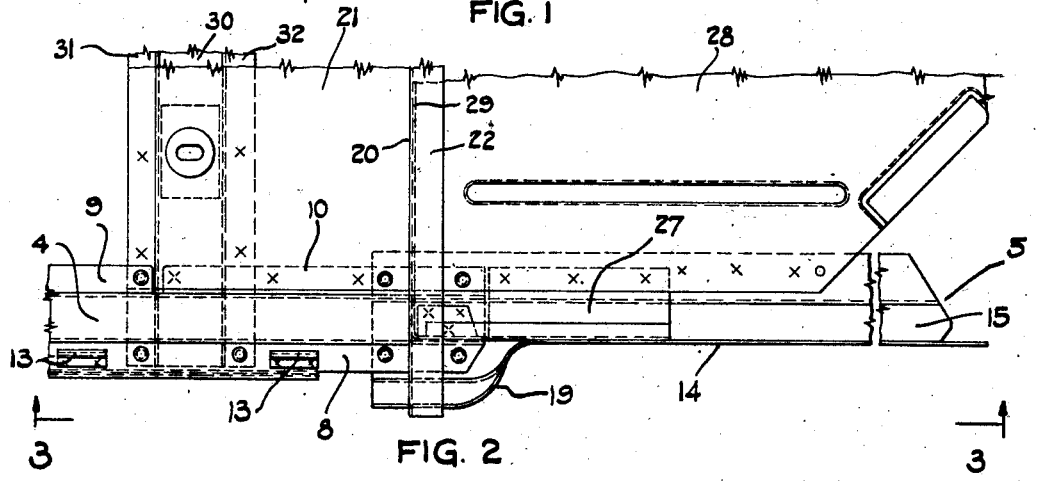
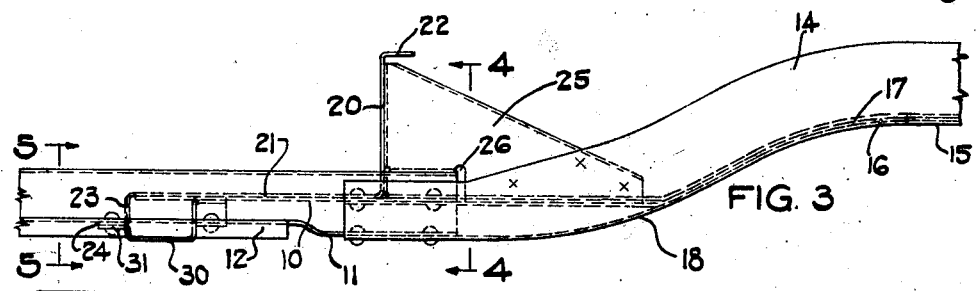
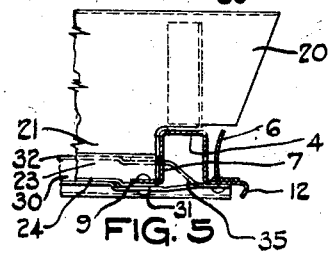
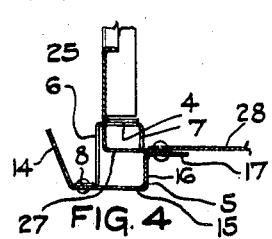
INVENTOR.
RALPH L. ADAMS
BY John P. Tarbox
ATTORNEY.

Patented June 24, 1930

1,767,500

UNITED STATES PATENT OFFICE

RALPH L. ADAMS, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY CONSTRUCTION

Application filed November 20, 1926. Serial No. 149,589.

This invention relates to an automobile body construction. It more particularly relates to a sill construction for an all metal automobile body.

Metal automobile bodies comprise, in general, a plurality of separate members, including sills, cross braces, door posts, body paneling, and other like elements, assembled and joined together into the completed body. It is important that these elements be so formed, that they may be readily assembled and joined together into the complete body structure, and that they be light in weight yet possess the necessary strength to withstand the strains to which they are subjected. Another important consideration is the facility with which the various elements may be produced, since they are usually pressed stampings.

The primary object of the present invention is to provide, in an all metal automobile body, a construction for the sills, and their associated parts, of such a nature, that the various elements may be readily formed by stamping operations, and easily assembled and secured together into a compact strong yet light construction readily adapted to receive the body paneling.

In addition to the primary object, other advantages and objects of the present invention will become apparent as the description proceeds.

The invention contemplates the accomplishment of these objects by forming the side body sills into two sections, and so uniting and securing these sections and other cooperating elements together, that an easily manufactured body results.

The various elements are flanged, or otherwise formed, so as to present corresponding portions to their adjacent elements to facilitate the uniting together thereof.

An embodiment, disclosing a desirable form which the invention may take, is illustrated in the accompanying drawing; wherein, Fig. 1 shows in side elevation an automobile body formed in accordance with the invention;

Fig. 2 is a top plan view of the sill construction, from the line 2—2 of Fig. 1, looking in the direction of the arrows;

Fig. 3 is a side elevation thereof taken on the line 3—3 of Fig. 2, and looking in the direction of the arrows;

Fig. 4 is a vertical section on the line 4—4 of Fig. 3; and

Fig. 5 is a vertical section on the line 5—5 of Fig. 3.

In the embodiment shown, the invention is applied to that form of closed automobile body commonly known now as a coach. The sill construction disclosed is admirably suited to this type of body which is of short length, although it should be distinctly understood that it is very suitable for many other types of bodies.

The body is depicted as including a cowl 1, doorway 2, and rear or tonneau portion 3. However, the construction or type of the body, apart from its general relation to the sill and its corelated elements, forms no part of the invention covered by this application.

The sill is formed in two parts, which will be designated as the main body side sill 4 and the tonneau side sill 5.

The main body side sill is constituted by a downwardly facing channel member extending from the front edge of the cowl 1 to approximately midway of the tonneau portion 3. The downwardly extending arms 6 and 7 are each provided with lateral flanges 8 and 9, respectively, at their ends. The arms are of equal length the greater portion of their extent, but, as clearly shown in Figs. 2, 3 and 4, the arm 7 is considerably shortened adjacent the rear end of the main body side sill. This causes the flange 9 to become an elevated flange 10, with respect to the flange 8, at this point. The flange 8 is straight until adjacent the rear end of the main body side sill, where it is downwardly offset to form a depressed flange portion 11. The outer flange 8, forward of the depressed portion, is formed with a downwardly turned lip 12 to facilitate the securement of the body paneling (not shown except in Fig. 1) thereto. Also upholstery clips or tabs 13 are secured upon the upper surface of the flange 8.

The tonneau side sill 5 is an angle member having an upwardly extending portion 14 and a horizontal arm 15, the inner end of which is upwardly bent and inwardly flanged as shown at 16 and 17, respectively. The rear end of the tonneau side sill is upwardly offset as indicated at 18 in Fig. 3, while the forward end of the portion 14 is outwardly offset, as indicated at 19 in Fig. 2. This upward offsetting of the sill and the outward offsetting of the portion 14, presents a construction, whereby the body paneling may be readily attached thereto in conformity with the contour of the body, and a wheel housing formed therein.

The joining of the main body side sill 4 and the tonneau side sill 5 is effected by placing the rear end of the former upon the forward end of the latter and then welding, or otherwise securing, the depressed outer flange 11 of the body sill to the horizontal portion 15 of the tonneau sill and the elevated inner flange 10 to the flange 17.

A vertical heel board 20 extends between the overlapped ends of the sills. This heel board has a forwardly projecting portion 21 forming a part of the floor boarding, on its opposite end forming a support for the upper seat pan. As clearly shown in the drawing, particularly Fig. 5, the heel board extends across and outwardly of the main body sill member. The forward end of the floor board portion 21 is turned downwardly, passing through the space between the inner flange 9 and the inner elevated flange 10 of the main body sill member. This downwardly turned portion is designated as 23, and is provided at its end with a forwardly projecting flange 24. The portion 21 of the heel board bears upon the elevated inner flange 10, and the flange 24 thereof bears against the underside of the inner flange 9. These coacting surfaces may be welded, or otherwise secured together.

A bracket member 25 extends rearwardly from the heel-board slightly inwardly of the ends thereof. This bracket has its forward part resting upon the upper side of the main body side sill, while its rear part passes downwardly of the end of the sill, as shown at 26 in Fig. 3. The lower end of this rear part has an inwardly projecting flange 27 bearing upon and welded, or otherwise secured to, the flange 17 of the tonneau sill.

A lower seat pan 28 rests upon and is secured to that portion of the flange 27 which is connected with the flange 17. The seat pan extends forwardly to the heel board, being upwardly flanged at 29 for connection thereto.

A reinforcement in the form of a flanged upwardly presenting channel 30 extends transversely of the body. The forward flange 31 of the channel 30 bears against and is welded to the underside of the flange 24 of the floor board and the underside of the flanges 8 and 9 of the main body sill. The rear flange 32 of the channel is upwardly deflected to meet the body of the floor board to which it is secured. The outer end of the rear flange 32 is deflected downwardly, so as to pass beneath the elevated flange 10 of the body sill, as indicated by the numeral 33, in Fig. 5.

The foregoing description is thought to have clearly explained the details, as well as the essentials of the construction, and that the same will now be plainly discernible.

It should be apparent that this construction accomplishes the objects hereinabove mentioned; that each element thereof may be formed by simple die stamping operations; that the elements are so formed that when assembled cooperating surfaces will be established allowing the use of spot welding; and that the whole embodies compactness without loss of strength.

The embodiment set forth being illustrative, the invention is only to be limited by the scope of the appended claims.

I claim:

1. In an automobile body construction, a main body side sill and a tonneau side sill forming an extension thereof, said main body side sill being a downwardly presenting flanged channel member the inner flange of which is raised and the outer flange of which is depressed adjacent one end thereof, and said tonneau side sill being an angle member overlapping and attached to both the depressed outer flange and the raised inner flange of the main body side sill.

2. In an automobile body construction, a main body side sill and a tonneau side sill forming an extension thereof, the tonneau side sill being an angle member having an upwardly then laterally projecting flange on one of its arms, and said main body side sill being a downwardly presenting channel member overlapping and attached both to the laterally projecting flange and to the arm carrying the same of the tonneau side sill.

3. In an automobile body construction, a main body side sill and a tonneau side sill forming an extension thereof, the tonneau side sill being an angle member having an upwardly then laterally projecting flange on one of its arms, and said main body side sill being a downwardly presenting flanged channel member the inner flange of which is attached to the laterally projecting flange of the tonneau side sill and the outer flange of which is attached to the arm carrying the said laterally projecting flange.

4. In an automobile body construction, a main body side sill and a tonneau side sill forming an extension thereof, the tonneau side sill being an angle member having a horizontally extending arm and an upwardly extending arm, the horizontally extending arm having an angle member connected to one of its ends, inversely arranged relatively to the tonneau side sill and said main body side sill being a channel member attached to the horizontal arms of the angle members forming the tonneau side sill.

5. In an automobile body construction, a main body side sill and a tonneau side sill, the tonneau side sill being an angle member having a horizontally extending arm and an upwardly extending arm, the horizontally extending arm having an angle member inversely arranged relatively to the tonneau side sill and of diminishing height from front to rear connected to one of its ends, and said main body side sill being a channel member attached to the horizontal arms of the angle members forming the tonneau side sill.

6. In an automobile body construction, a main body side sill and a tonneau side sill forming an extension thereof, said main side sill being formed of inversely arranged angle members, and said main body side sill being a channel member attached directly to the parallel arms of the angles forming the tonneau side sill.

7. In an automobile body construction, a main body side sill and a tonneau side sill forming an extension thereof, said main body side sill being a downwardly presenting flanged channel member the outer flange of which is depressed and the inner flange of which is raised adjacent one end thereof, and said tonneau side sill being an angle member having an upwardly then laterally projecting flange on one of its arms, the raised flange of the main body side sill being attached to the laterally projecting flange of the tonneau side sill and the depressed flange thereof being attached to the arm carrying the said laterally projecting flange.

8. In an automobile body construction, a main body side sill and a tonneau side sill forming an extension thereof, said main body side sill being a downwardly presenting flanged channel member the outer flange of which is depressed and the inner flange of which is raised adjacent one end thereof, and said tonneau side sill being an angle member having a horizontally extending arm and an upwardly extending arm, the horizontally extending arm having an angle member inversely arranged relatively to the tonneau side sill connected to one of its ends, the depressed outer flange of the main body side sill being attached to the horizontal arm of the tonneau side sill and the raised inner flange thereof being attached to the corresponding arm of the inversely arranged angle member.

9. In an automobile body construction, a main body side sill and a tonneau side sill, said main body side sill being a downwardly presenting flanged channel member the outer flange of which is depressed and the inner flange of which is raised adjacent one end thereof, and the tonneau side sill being formed of, inversely arranged angle members, the main body side sill telescopically engaging the tonneau side sill in overlapped relation therewith and the raised inner and the depressed outer flanges of the main body sill being attached to the corresponding arms of the inversely arranged angle members.

10. In an automobile body construction, a main body side sill and a tonneau side sill, the main body side sill being a flanged channel member the inner flange of which is formed in two sections, a heel board connected to said main body side sill and said tonneau side sill having a forwardly extending portion resting upon the upper side of one of the sections of said inner flange and extending beneath the other section thereof.

11. In an automobile body construction, a main body side sill and a tonneau side sill, the main body side sill being a downwardly presenting flanged channel member the inner flange of which is formed in two sections arranged in different horizontal planes, a heel board connected to said main body side sill and said tonneau side sill having a forwardly extending portion resting upon the upper section of the said inner flange and extending beneath the lower section thereof.

12. In an automobile body construction, a main body side sill and a tonneau side sill, said main body side sill being a downwardly presenting flanged channel member the inner flange of which is formed in two sections arranged in different horizontal planes, an upwardly presenting flanged channel member extending transversely of the body and having one of its flanges connected to the lower section of the inner flange and also to the outer flange of the main body side sill and the other flange thereof passing beneath the upper section of the inner flange and connected to the outer flange.

13. In an automobile body construction, a main body side sill and a tonneau side sill, said main body side sill being a downwardly presenting flanged channel member the inner flange of which is formed in two sections arranged in different horizontal planes, a heel board attached to the said sills having a forwardly extending portion constituting a floor board resting upon the upper side of the upper inner flange and extending beneath and secured to the lower inner flange, an upwardly presenting flanged channel member extending transversely of the body having its front flange secured to the underside of the flanges of the main body sill and to the front end of the floor board and its rear flange upwardly deflected to meet the floor board transversely of the body.

14. In an automobile body construction, a main body side sill and a tonneau side sill, said tonneau side sill being formed of two inversely arranged angles one of which is of diminishing height from front to rear, a heel board connected to the said sills having a bracket extending rearwardly adjacent the end thereof and connected to the upper arm of the diminishing angle.

15. In an automobile body construction, a main body side sill and a tonneau side sill, said main body side sill being a flanged channel member, said tonneau side sill being an angle member connected to the flanges of the main body side sill, a heel board connected to the sills having a forwardly extending portion constituting a floor board secured to the inner flange of the main body side sill, an upwardly presenting channel member extending transversely of the body having one flange connected to the flanges of the body sill and to the front edge of the floor board and its other flange upwardly deflected to engage beneath the floor board, and a seat pan arranged to the rear of the heel board and secured to the tonneau side sill.

In testimony whereof he hereunto affixes his signature.

RALPH L. ADAMS.